United States Patent
Arumugam (10) Patent No.: US 10,540,817 B2
(45) Date of Patent: Jan. 21, 2020

(54) SYSTEM AND METHOD FOR CREATING A FULL HEAD 3D MORPHABLE MODEL

(71) Applicant: AUGRAY PVT. LTD., Chennai (IN)

(72) Inventor: Swaminathan Arumugam, Chennai (IN)

(73) Assignee: AUGRAY PVT. LTD., Chennai (IN)

(*) Notice: Subject to any disclaimer, the term of this patent is extended or adjusted under 35 U.S.C. 154(b) by 23 days.

(21) Appl. No.: 15/912,090

(22) Filed: Mar. 5, 2018

(65) Prior Publication Data

US 2018/0253895 A1   Sep. 6, 2018

(30) Foreign Application Priority Data

Mar. 3, 2017  (IN) .............................. 201741007661

(51) Int. Cl.
| | |
|---|---|
| G06T 19/00 | (2011.01) |
| G06T 17/20 | (2006.01) |
| G06K 9/00 | (2006.01) |
| G06T 13/40 | (2011.01) |

(52) U.S. Cl.
CPC .......... *G06T 17/20* (2013.01); *G06K 9/00268* (2013.01); *G06T 13/40* (2013.01); *G06T 19/006* (2013.01)

(58) Field of Classification Search
CPC ....... G06T 17/20; G06T 19/006; G06T 13/40; G06K 9/00268
See application file for complete search history.

(56) References Cited

U.S. PATENT DOCUMENTS

| | | | |
|---|---|---|---|
| 8,971,572 B1* | 3/2015 | Yin | G06K 9/00355 345/173 |
| 2006/0067573 A1* | 3/2006 | Parr | G06K 9/00201 382/154 |
| 2009/0135176 A1* | 5/2009 | Snoddy | G06Q 30/02 345/419 |
| 2014/0043329 A1* | 2/2014 | Wang | G06T 17/20 345/420 |
| 2015/0044649 A1* | 2/2015 | Voss | G06K 9/00315 434/236 |
| 2016/0026253 A1* | 1/2016 | Bradski | G02B 27/225 345/8 |

* cited by examiner

*Primary Examiner* — Robert J Craddock
(74) *Attorney, Agent, or Firm* — Seed Intellectual Property Law Group LLP (57) ABSTRACT

The present subject matter relates to a system and a method for generating a full head 3D morphable model. In an aspect, the system includes an identification module to identify one or more feature points as a collection of principal regions of an input 2D image. A 3D reconstruction engine generates the full head 3D morphable model by mapping feature points of the principal regions with corresponding feature points of predefined trained 3D mesh models. A rigging and animation module joins the full head 3D morphable model to a body of an animatable object to obtain a final 3D morphable model. Further, in an aspect, audio content may be added to the final 3D morphable mode to cause the final 3D morphable model to lip-sync with the audio content, and rendered in one of an AR, a MR or a VR medium.

17 Claims, 4 Drawing Sheets

SYSTEM AND METHOD FOR CREATING A FULL HEAD 3D MORPHABLE MODEL

TECHNICAL FIELD

The present subject matter in general, relates to creating full head three-dimensional (3D) morphable models, and in particular relates to a system and a method for creating a full head 3D morphable model from a single two-dimensional (2D) image of a face, the 3D morphable model being suitable for augmented reality (AR), virtual reality (VR) and mixed reality (MR) mediums.

BACKGROUND

Visualization of a live action or an event in a 3D representation is gaining popularity in various settings, such as games, social media, television industry, cinematography, remote meetings in offices, and the like. Suitable AR, MR and VR mediums are being built to utilize 3D representation of objects in the live action or event. The 3D representations may be static, animated or live real motion. The 3D representation of an object is usually associated with a human, humanoid, animal, scientific characters or an object that has unique geometric or appearance to be used in a medium of AR, MR or VR.

Generally, 3D representations are divided into two categories—viz—Boundary Representations (B-reps) and Space partitioning representations. Boundary Representations (B-reps) describe a 3D object as a set of surfaces that separates an object's interior from the environment. Space partitioning representations describe interior properties, by partitioning the spatial region containing an object into a set of small, non-overlapping, contiguous solids. 3D surfaces and solids can be approximated by a set of polygonal and line elements. Such 3D surfaces are called polygonal meshes. For example, in a polygon mesh, each edge is shared by at most two polygons. This 3D polygon mesh set enables depth information to be added on to a 2D image. The polygonal mesh way of visualizing the image in principle represents the surface that is to be displayed in a 3D platform as a set of points called polygonal vertices and the polygonal geometric surfaces then form the region with a set of polygonal vertices.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

The present subject matter relates to a system and a method for creating a full head three-dimensional (3D) morphable model from a single two-dimensional (2D) image of a face. The full head 3D morphable model is generated using one or more predefined trained 3D mesh models, which covers a number of geometric possibilities of 3D features that may be encountered depending on age, gender and ethnicity of the person whose 2D image is processed to obtain the 3D morphable model. The 3D morphable model may be used in one of AR, MR and VR mediums. This description of the present subject matter illustrates a newer approach to generate the 3D morphable model from the single 2D image.

The definition for AR, VR and MR are known in art and also briefly described below. VR is a computer technology that replicates an environment, real or imagined, and simulates a user's physical presence in the constructed environment in a way that allows the user to interact with it. In AR applications, the real world is enhanced with virtual computer graphics that are visible to the user in real world via a display technology such as a heads up display or a projector or smart phones. The augmentation might be something as simple as text notifications or as complex as a simulated screen. As such, AR attempts to combine a real environment surrounding a user along with synthetically generated images in tandem. In MR, one combines the best of AR and VR by allowing the user to see the real world around them while also seeing virtual objects rendered into the user's field of view.

Conventional techniques for generating a full head 3D morphable model uses a trained dataset stored in a library. The trained dataset may include a plurality of 3D mesh models. For example, the trained dataset is mixed with models related to different age group persons and different ethnic groups such as Asian, African etc. For example, the age of the people was categorized into five groups (9 teens having age between 0-19 years, 106 young adults having age between 20 to 29, 33 adults having age between 30 to 44 and 13 mature persons having age between 45 to 59 and 8 senior citizens having age of more than 60 years). In such a case, generating the full head 3D morphable model is difficult and inaccurate due to mixture of models of different age persons and also ethnicity of models in the single trained dataset. For example, the generation of the full head 3D morphable model for an older age person is not accurate using the trained dataset because the number of models stored in the library for the old aged persons are not sufficient.

Further, the conventional techniques categorize the models at runtime based on age, gender, and ethnicity. The number of models to be analyzed may be increased exponentially to the number of entries in the library and therefore 3D full head morphable model creation becomes slow.

Further, some of the conventional techniques utilizing the trained datasets may not have the capabilities of producing the full head 3D model from a single 2D image, or it may require the frontal face along with a back head and other views in the form of the 2D image in order to produce the full head 3D model, which may make the construction process longer, consuming more time and doesn't provide a seamless real time AR, VR and MR viewing experience.

In addition, with a large segment of the global population communicating through smart phones, in the context of social media, marketing and advertising, professional meetings, and others, there is a need for representation of humans in various forms that can be animated to communicate. For example, during a mobile video phone call happening over the telephony network that makes the 3D animation at either end of the call in progress to visualize and experience both parties as an animated subject at the contents of the call that is dynamic in nature.

The present subject matter is capable of producing a full head 3D morphable model of a user in the form of a personalized or an animated model, without capturing the back head or any other alternate views of the user. Further, in the present subject matter, the trained dataset is pre-categorized into a plurality of datasets based on specific age, gender and ethnicity basis. Ethnicity here means that each dataset includes a geographical region based classification which characterizes the actual facial features that need to be reproduced with reasonable accuracy into the 3D model. Thus, by providing such categorizations and classifying the categorizations based on the geographical regions increases the accuracy of the 3D morphed model as opposed to the conventional techniques.

In an embodiment, the present subject matter relates to a system and a method for generating a full head 3D morphable model from a single 2D image. The system includes an image capturing unit to capture a 2D image of a subject and an identification module to identify feature points or landmark points as a collection of principal regions on a face portion of the 2D image. The identification module corrects the principal regions of the 2D image by re-sizing the feature points to obtain scaled principal regions. Further, the system includes a 3D reconstruction engine module to generate the full head 3D morphable model by mapping the feature points of the scaled principal regions with feature points of principal regions of predefined trained 3D mesh models stored in one or more databases to select one or more 3D mesh models from the predefined trained 3D mesh models. Each selected 3D mesh model includes at least one principal region equivalent to a corresponding scaled principal region of the 2D image. Further, in an embodiment, the system includes a rigging and animation module. The rigging and animation module is configured to join the full head 3D morphable model's neck zone with a body of an animatable object to obtain a final 3D morphable model; add audio content to cause the final 3D morphable model to lip-sync (lip synchronization) the audio content; and render the 3D morphable model in one of the AR, the MR or the VR mediums with animation and lip-sync.

Further, in an embodiment, the system of the present subject matter is capable of generating two or more full head 3D morphable models and can display the models conjointly in a single medium or across mediums, for example, in the AR medium. For example, two persons conversing using smart devices may represent themselves as the full head 3D animated models to one another. In another example, users connected through a social networking platform can represent themselves conversing using their 3D model representations.

Aspects of the present subject matter related to the system and method will now be described in detail in conjunction with the following figures. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present subject matter. Moreover, all statements herein reciting principles, aspects, and specific examples thereof, are intended to encompass equivalents thereof.

Figure 1:
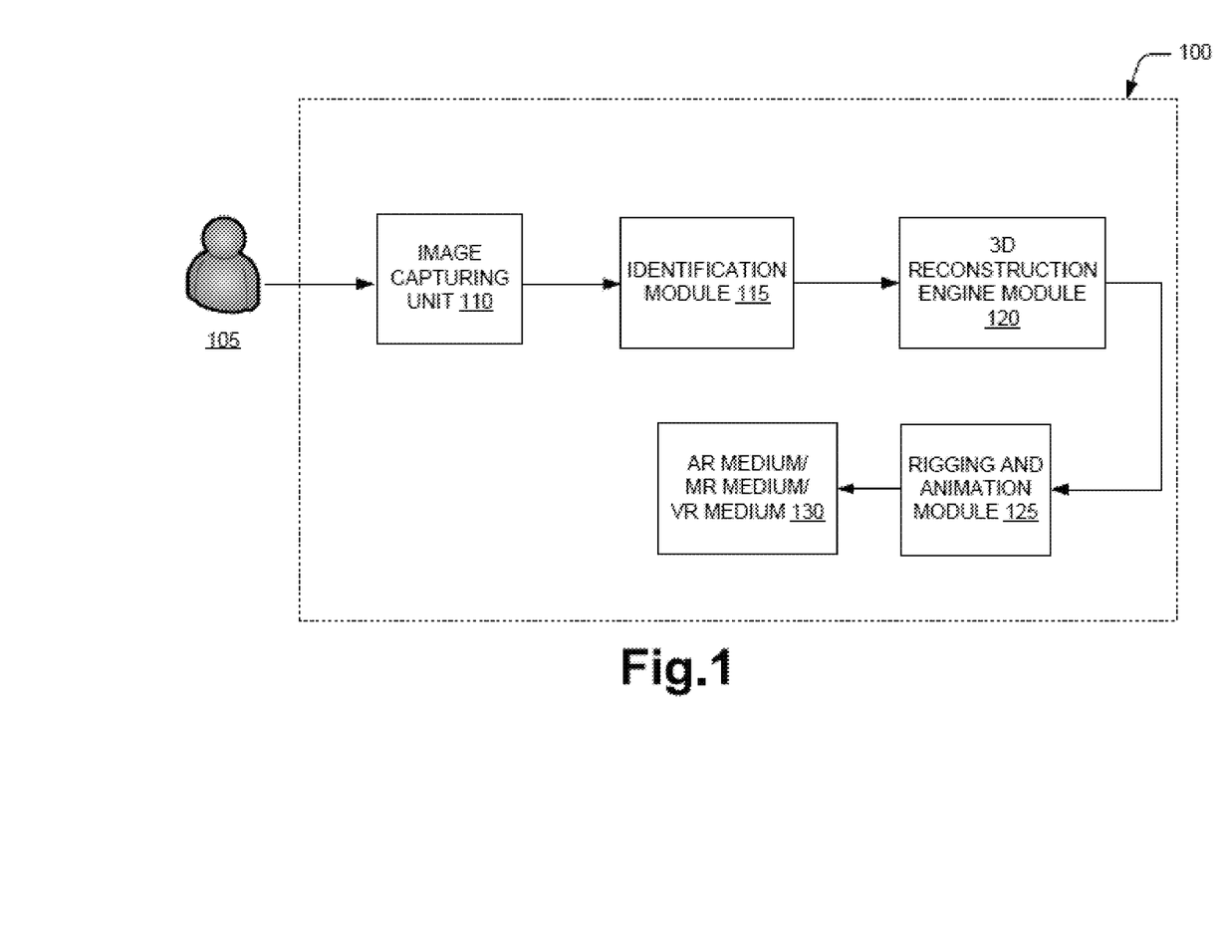
FIG. 1 illustrates a block diagram representation of a system of for generating a full head 3D morphable model from a single 2D image and pre-defined trained 3D mesh models, in accordance with an embodiment of the present subject matter.

FIG. 1 illustrates a block diagram representation of a system for generating a full head 3D morphable model from a single 2D image and predefined trained 3D mesh models, in accordance with an embodiment of the present subject matter. As shown in the FIG. 1, the system 100 includes an image capturing unit 110, an identification module 115, a 3D reconstruction engine module 120, and a rigging and animation module 125. The system also includes databases or database libraries (not shown in the FIG. 1). The database libraries may include predefined 3D trained mesh models. The database libraries or databases are divided to include mesh models of same type. For example, a database library includes mesh models suitable for male gender. In another example, another database library may include mesh models suitable for female gender. Similarly, the database libraries are divided based on age, gender and ethnicity. Thus, the databases or the database libraries in the trained dataset are pre-categorized based on the gender, age, and ethnicity groups.

The system is a computing system, which includes one or more processors, one or more interfaces, and a memory coupled to the processor(s) (not shown in the FIG. 1). It will be understood that the computing system may be a desktop, a laptop, a server, and the like.

The processor(s) can be a single processing unit or a number of units, all of which could include multiple computing units. The processor(s) may be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions and data stored in the memory.

The functions of the various elements shown in the figures, including any functional blocks labeled as "processor(s)", may be provided through the use of dedicated hardware as well as hardware capable of executing software in association with appropriate software. When provided by the processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage.

The interface(s) may include a variety of software and hardware interfaces, for example, interfaces for peripheral device(s), such as a keyboard, a mouse, an external memory, and a printer. The interface(s) can facilitate multiple communications within a wide variety of networks and protocol types, including wired networks, for example, local area network (LAN), cable, etc., and wireless networks, such as Wireless LAN (WLAN), cellular, or satellite. For the purpose, the interface(s) may include one or more ports for connecting a number of devices to each other or to another computing system.

In an embodiment, the modules depicted in the FIG. 1 are implemented using hardware, and/or software, which may be resident in the memory of the computing system. The memory may also include the database libraries interfaced with the modules.

In an embodiment, the computing system 100 may also be in a network where the software may be in a server and called in to do the necessary computations for creating the 3D model and render the model in AR, VR or MR mediums.

In another embodiment, with smart devices available today for use, the hardware and software to implement the entire set of blocks in the FIG. 1 can be implemented (reside) within the smart devices.

In another embodiment, the database and the modules may be resident in any node in the network or in a cloud and may be called at run time for creating the full head 3D morphing model and can be used by the AR, MR and VR mediums 130 implemented in the smart devices.

The image capturing unit 110 may capture a 2D image of subject 105. Hereinafter, the words subject and the object may be used interchangeably. For example, the subject 105 is a human face, and the 2D image may be a human face at an angle, for example, frontal in nature, so that features of the 2D image that characterize the image of the person are unique to identify personalized features. Here the use of the term "personalized features" include among other things, skin color, head size, feature geometry like the eyes, mouth, nose etc.

The image capturing unit 110, for example, is a camera. The camera may obtain at least one 2D image. In an example, the 2D image may comprise multiple frames from a video camera. The camera may be integral with the system such as a web cam, cell phone camera, tablet computer camera, and their like. In an example, the system 100 requests the user to select the image from existing pictures in gallery of a smart device. Next, the 2D image captured may be communicated to the identification module 115.

The identification module 115 may be configured to identify feature points or landmark points as a collection of principal regions on a face portion of the 2D image, and further the identification module 115 corrects the principal regions of the 2D image by re-sizing the feature points to obtain scaled principal regions. For example, correcting the principal regions include enhancing length and breadth of the principal regions to obtain the scaled principal regions such that a region including the scaled principle regions may be wrapped around on the front portion of the full head 3D morphable model upon creation.

For example, the feature points may be one of eyes, lips, nose, or their like combination. Each principal region is defined by a boundary or contour of the feature points. For example, a principal region is defined for nose of the captured image. The principal regions are the regions which provide characterization of unique appearance features which are to be mapped into the 3-D model. Rest of the region other than the principal regions in the 2D image outside the contours may be termed as a balance region. The steps in the principal region identification can be either carried out manually or an automated image processing steps that identifies the principal regions which for example can be the two eyes, the nose, and the mouth. Further, all the principal regions, in combination, can be identified as a single region, which will be further described with respect to the FIG. 3.

In an embodiment, the identification module 115 identifies the features points by employing one of conventional models or computing methods such as Active Shape Model (ASM) and Active Appearance Model (AAM). These methods may be stored as library components that are called on demand by the processor of the computing system 100 in the process of creating the full head 3D morphable model.

In an aspect, the 3D reconstruction engine module 120 performs the reconstruction of the principal regions by employing a reconstruction computational method, for example, the method of Principal component analysis (PCA), which is known to a person skilled in the art. The reconstruction method may use the feature points extracted by the identification module 115, and trained dataset having the predefined trained 3D mesh models. In an embodiment, the predefined trained 3D mesh models may be stored in the database libraries. Each one of the predefined trained 3D mesh model is a full head 3D mesh model. The 3D mesh models are represented as 3D polygonal meshes having plurality of mesh vertices, plurality of vertex points which ensures the resolution of the 3D representation. A number of mesh vertices in each 3D mesh model may be in the range from about 15000 points to 45000 points and is preferably 15000 points. Each of the full head 3D mesh comprises a rear head mesh and frontal face mesh. In an example, polygonal surfaces are formed by interconnected proximal vertex points and represents 3D model covered by the points within a given region of the 15000 to 45000 vertex points. The number of points in this mesh representation has direct relation to the clarity of the rendering by way of resolution. However, as the number of vertex points for each mesh model increases, the size of the database storing the mesh models increases and also increases the processing time during the reconstruction process.

The 3D reconstruction engine module 120 generates the full head 3D morphable model by mapping the feature points of the scaled principal regions with feature points of principal regions of the predefined trained 3D mesh models stored in one or more databases to select one or more predefined trained 3D mesh models from the predefined trained 3D mesh models. Each selected 3D mesh model includes at least one principal region equivalent to a corresponding scaled principal region of the 2D image. The 3D reconstruction engine module 120 selects the one or more databases from the databases for construction of the full head 3D morphable model based on at least one of age, gender, and ethnicity of the subject. For example, while a male Asian 2D face image is being reconstructed, the male Asian generic database will be dynamically chosen by the 3D reconstruction engine module 120 during the process of reconstruction. Thus, each of the 3D mesh model has a unique identification with a typical age, gender and ethnicity of a given human head representation.

The 3D reconstruction engine module 120 selects one or more 3D mesh models from the predefined trained 3D mesh models of the selected database by comparing values of vertex points of the principal regions of features in the 3D mesh models with values of vertex points of the principal regions of the corresponding features. In an aspect, 3D reconstruction engine module 120 performs the comparison principal region by principal region. For example, vertex points associated with a nose of the 2D image is compared with vertex points associated with a nose of the predefined trained 3D mesh models to identify a best or closest model.

Further, the 3D reconstruction engine module 120 constructs the full head 3D mesh model by combining the at least one principal region of the selected 3D mesh models. For example, the 3D reconstruction engine module 120 may select three mesh models from the plurality of mesh models in the one or more databases, where a first mesh model includes a principal region which is equivalent to a principal region corresponds to a nose of the subject, a second mesh model includes a principal region which is equivalent to a principal region corresponds to a left eye of the subject, and a third mesh model includes a principal region which is equivalent to a principal region corresponds to a right eye of the subject. The 3D reconstruction engine module 120 then combines the principal regions corresponding to the nose, left eye and the right eye to generate the full head 3D morphable model.

Each feature of the principal regions identifiable in selected mesh models can be joined to synthetically construct a new and true representative of the structure of the full head 3D morphable model, which is in turn representative of the 2D image.

The necessary texture and skin color that characterize the 2D image may be applied onto the full head 3D morphable model. In an aspect, the skin tone of the subject can be accessed using conventional methods to identify the color and uses the closest matching skin color accordingly in the full head 3D morphable model.

In an aspect, the necessary texture and skin color representations may be carried out by the 3D reconstruction engine module 120 may by wrapping around on a front portion of the full head 3D morphable model to provide a realistic appearance of the input 2D image in a 3D view space.

The reconstructed full head 3D morphable model with the necessary skin color and skin texture is then rigged to a full body by the rigging and animation module 125 to obtain a final 3D morphable model suitable for AR, MR or VR mediums. The body of the animated object may be a human or any other form that could include an animal or other imaginary objects/models whose structure is rigged to the neck part of the full head 3D morphable model. The body can also include other inanimate objects like a stick to which the full head 3D model is attached.

The rigging and animation module 125 joins the full head 3D morphable model's neck zone with the body of an animatable object to obtain the final 3D morphable model. The joining of the full head 3D morphable model to the body is achieved by close positioning the polygonal mesh vertices of the full head model in the neck-region over the top end vertices of the mesh model of the body to which the full head 3D model is to be considered for animation. The animation module 125 then adds audio content to cause the final 3D morphable model to lip-sync with the audio content and the animation module further renders the final 3D morphable model in one of the AR, the MR or the VR mediums.

The body to which the head is rigged provides a platform to provide skeletal animation where the animation movement schedule on a time base frame by frame activation is carried out on the key structural elements of the support structure to which the full head is rigged and these structural elements are called "bones" in this description. Thus any movement of the bones of the rigged body of the 3D full head ensures a 3D movement of the full head 3D model in the appropriate axis. These movement, as an example could be that the top half of the "bones" bend so that the full head is made to move down like a human bending over. In another example movement the torso movement can be executed as the animation of the "bones" and the full head 3D mode turns on the appropriate axis. In essence the "bones" structure of the body to which the full head 3D model is attached provides a mechanism to animate the full head movement on all possible axes that is used in AR, MR and VR medium.

In yet another embodiment, the constructed head will have facial structures that will accommodate other lip synchronization methods known in art, based on an audio input to create a realistic human lip (mouth) movement and thus present a realistic experience of human used in AR, MR and VR mediums.

The AR, MR and VR module medium 130 provides the necessary control for the movement through the animation sequence when rendered in the AR, MR and VR mediums. The movement control is intricately connected to the movements animated in the "bones" as explained in the previous paras and forms the realistic presentation in the AR, MR and VR mediums.

The description of this subject matter will now be explained with respect to the FIG. 2, which outline the steps that the software and hardware integrated modules would execute to realize the conversion of the 2D image to a fully animated full head 3D morphable model rigged to a suitable body.

Figure 2:
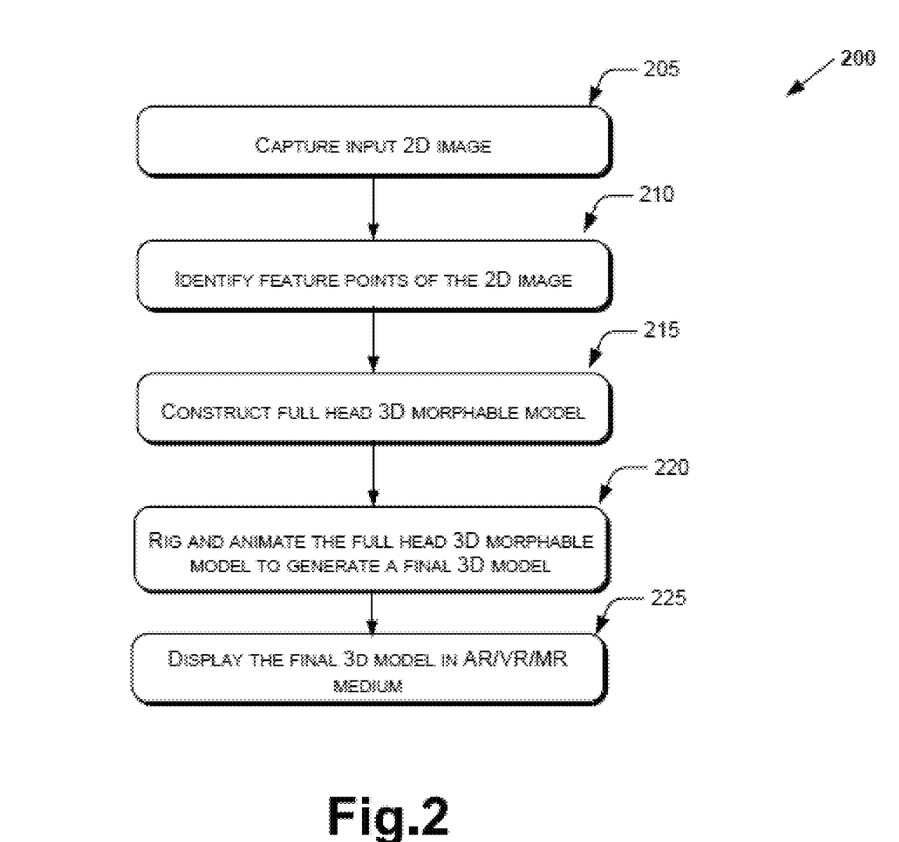
FIG. 2 illustrates a flow chart of a method for generating a full head 3D morphable model from predefined trained 3D mesh models and a single 2D image, in accordance with an embodiment of the present subject matter.

FIG. 2 illustrates a flow chart of a method of generating a full head 3D morphable model from predefined trained 3D mesh models and a single 2D image, in accordance with an embodiment of the present subject matter. The order in which the method blocks are described in the flowchart is not included to be construed as a limitation, and some of the described method blocks can be combined in any order to implement the method 200, or an alternative method. Additionally, some of the individual blocks may be deleted from the method 200 without departing from the scope of the subject matter described herein.

In an embodiment, at step 205, an image capturing module 110 may capture a 2D image 205 of a frontal portion of a subject, for example, human. In another embodiment, the 2D image can be selected from a database. For example, the 2D image may have a pixel area of 512×512 pixels. This pixel based definition and reduction to a given size ensures that the feature points and shape identified by the identification module 115 can be mapped to a vertex based array listing for creating the full head 3D morphable model at step 215.

At step 210, the method includes identifying one or more feature points as a collection of principal regions on the face portion of the 2D image and correcting the principal regions of the 2D image by re-sizing the feature points to obtain scaled principal regions. In an embodiment, the identification module 115 identifies the one or more features points by employing one of known classical models such as Active Shape Model (ASM) and Active Appearance Model (AAM).

For example, the feature points may be one of an eye, lip, nose, or their like combination. Each principal region is defined by a boundary or contour. For example, a principal region is defined for nose of the captured image. Rest of the region other than the principal regions in the 2D image outside the contours may be termed as a balance region. The steps in the principal region identification can be either carried out manually or by an automated image processing techniques. Further, all the principal regions, in combination, can be identified as a single region, which will be further described with respect to the FIG. 3.

To create the full head 3D morphable model having a rear head portion and frontal face portion, the feature points within the scaled principal regions are subjected to further processing. The 3D reconstruction engine module 120 may reconstruct the scaled principal regions, which in the 2D format, into a 3D mesh, which is a collection of vertices and polygons that define the shape of the scaled principal regions in 3D. In an aspect, the 3D reconstruction engine 120 performs the reconstruction of the scaled principal regions by employing a reconstruction algorithm, for example, Principal component analysis (PCA) method, which is known to a person skilled in the art. The reconstruction method may use the feature points of the scaled principal regions, the predefined trained 3D mesh models, and optionally depth information of the feature points for the reconstruction. Each 3D mesh model is a full head 3D mesh model comprising a rear head mesh and frontal face mesh. The predefined trained 3D mesh models may be stored in one or more databases. In an example, each full head 3D mesh model includes mesh vertices and a number of mesh vertices in each 3D model is in the range from about 15000 points to 45000 points, and preferably 15000 points.

At step 215, the method includes generating the full head 3D morphable model by mapping the feature points of the scaled principal regions with feature points of principal regions of predefined trained 3D mesh models stored in one or more databases to select one or more 3D predefined trained mesh models from the predefined trained 3D mesh models. Each selected 3D mesh model includes at least one principal region equivalent to a corresponding scaled principal region of the 2D image.

In an aspect, the method includes selecting the one or more databases from available databases for construction of the full head 3D morphable model based on at least one of age, gender, and ethnicity of the subject. As previously discussed, the available databases are pre-categorized based on at least one of gender, age, and ethnicity groups. For example, while a male Asian 2D face image is reconstructed, the male Asian generic database will be dynamically chosen by the 3D reconstruction engine 120 during the process of reconstruction. Further, the method includes comparing values of vertex points of the principal regions of features in the 3D mesh models with values of vertex points of the principal regions of the corresponding features to select the one or more 3D mesh models from the predefined trained 3D mesh models.

In an aspect, at least one principal region of the selected mesh models is equivalent to a corresponding scaled principal region of the 2D image if values of vertex points of at least one principal region of the selected mesh models are close to values of vertex points of the corresponding scaled principal region of the 2D image. The 3D reconstruction engine module constructs the full head 3D mesh model by combining the at least one principal regions of the selected 3D mesh models. For example, the 3D reconstruction engine module 120 selects three mesh models from the plurality of mesh models in the one or more databases, where a first mesh model includes a principal region which is equivalent to a principal region corresponds to a nose of the subject, a second mesh model includes a principal region which is equivalent to a principal region corresponds to a left eye of the subject, and a third mesh model includes a principal region which is equivalent to a principal region corresponds to a right eye of the subject. The 3D reconstruction engine module 120 then combines the principal regions corresponding to the nose, left eye and the right eye to generate the full head 3D morphable model by adding a rear head portion selected from any one of the selected predefined 3D mesh models.

In an aspect, the method comprising applying a texture for the full head 3D morphable model based on texture of the input 2D image.

At step 220, the method includes rigging the full head 3D morphable model, by the rigging and animation module 125, to a body of an animatable object to obtain a final 3D morphable model, and animating the final 3D morphable model by adding audio content to cause the final 3D morphable model to lip-sync the corresponding audio content. The rigging and the animation module 125 ensures that the animation part of the full head 3D model including the lip-sync can be created as an animation file and used for various animations with voice data stream in real time The rigging and the animation is further explained with respect to the FIG. 3

At step 225, the method includes rendering the final 3D morphable model in one of the AR, the MR or the VR display mediums.

Figure 3:
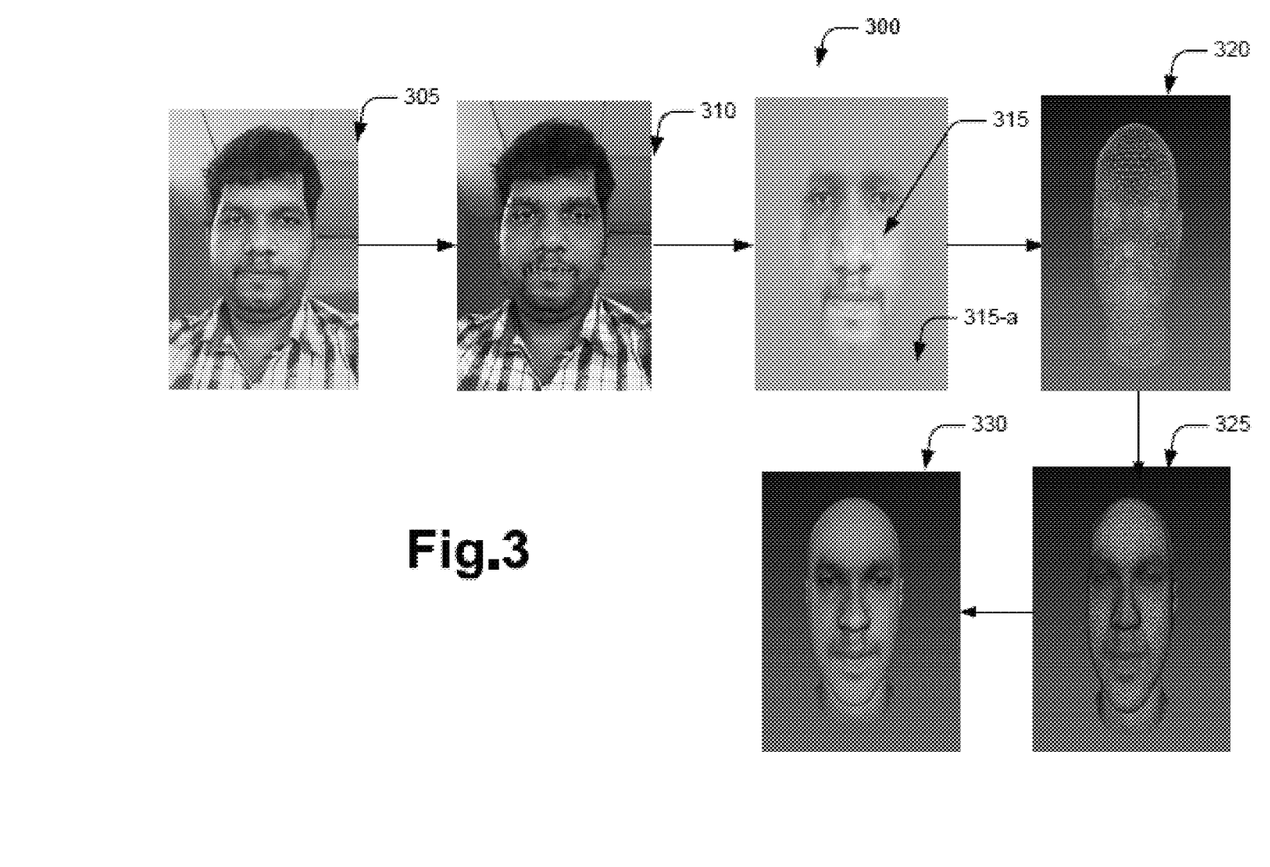
FIG. 3 illustrates an example process employed by the system of the FIG. 1 for generating a full head 3D morphable model from a frontal (face) 2D image of a human and pre-defined trained 3D mesh models, in accordance with an embodiment of the present subject matter.

FIG. 3 illustrates an example process employed by the system of the FIG. 1 for generating a full head 3D morphable model from a frontal 2D image of a person and predefined trained 3D mesh models, in accordance with an embodiment of the present subject matter. The 2D image 305 is an input to generate the full head 3D morphable model. The image 305 as shown is resized, for example, to a size 512×512 pixels so that precise group of pixels can be mapped to one or more of the predefined trained 3D mesh models to construct the full head 3D morphable model.

Next, principal regions having one or more feature points are identified as shown in dots in the image 310. The principal regions provide personalization to the image and converted as features in the full head 3D morphable model. The overall skin color and texture that is to be mapped in the full head 3D morphable model can also identified in this stage.

The overall contour at the periphery of the collection of principal regions identify the unique personal characteristics of the animation object created will then be used in the AR, MR and VR mediums. The color forms the first basis of creating the initial step of preparing the bound principal region periphery region into two regions 315 and 315-*a*. The base selection of the identified summated area 315 and 315-*a* is the color of the area to be identified with 315 and 315-*a* that are part of the feature set needed to be personalized in the full head 3D model to be constructed. The creation of the two parts of this image step designated as 315 and 315-*a* is critical to the 3D reconstruction.

The features identified as the principal regions bounded by 315 as represented in the 2D image as a set of pixels that are subset part of the full pixel mapped image, which in the example is considered 512×512 pixels, is to be, by the reconstruction procedure of the full head 3D morphable model, wrapped around the surface of the face in the full head 3D model and the wrap around should accommodate the feature that formed a 2D geometry into a 3D surface and so there has to be necessary length and width extensions to accommodate this wrap around when the 3D full head mesh is constructed. The wrap around over the 3D mesh model would personalize the full head 3D model constructed as would be explained in the next paras.

Next, the 3D reconstruction engine module constructs the full head 3D model, for example, by using PCA method. PCA based coefficients are computed for each of the principal regions and the PCA based coefficients to be mapped to similar regions from the list of 3D polygonal mesh models available in the library database. A unique feature in this method over prior art known in mapping to full head 3D models in the database is to consider the principal region PCA coefficients for equivalent principal regions in the complete set of full head 3D models available in the database.

In one example, the full head model held in the database could be characterized according to the total vertices available and the resultant 3D mesh patterns for each of the feature points that personalize the region 315. Thus the left eye can come from one 3D polygonal mesh, the right eye from another and the nose from another and so on. The complete selections of the regions picked form the various database 3D full head models are then combined to synthesize a completely new full head 3D model with the selected principal region meshes mapped into the synthetic model. This enables the fact that the 3D full head models are also consistent in the same number of 3D mesh vertices so that the selected principal regions feature mesh collections can be stitched together to form the truly personalized full head facial features 320 creating a full head 3D reconstruction.

The collection of scaled principal regions 315 is wrapped around the full head 3D morphable model 320 to get the colour and textured personalized facial features in the step 325 where the wrap around and map the 512×512 pixels in the 2D image 315 to the number of points in the full head 3D polygonal mesh, which in an illustration is taken as 15000 mesh vertex points. This wrap around with the mapping of the region 315 to the vertex points of the synthesized full head 3D model provides the necessary personalization of the created 3D full head model. In the final step, the polygonal 3D mesh is removed and the coloured textured facial surface as transferred to the full head 3D model 330 is now available for animation in a AR, MR and VR mediums.

The full head personalized 3D model is then rigged to a suitable body with "bones" structure so that animation of the full head 3D model can be activated from the bone animation used in the skeleton bone animation. As this methodology is known in art, this procedure is not further explained in this description.

According to an embodiment, one or more (application call engines to use the animated 3D image) rendering engines are provided to render the animated 3D image on to a display unit of a dedicated computing device using any of AR, MR and AR mediums. The animated 3D object, in addition, may be made responsive to a plurality of gestures by using one or more conventional techniques as known in art from the user that can be linked to "bones" movement of the rigged full head 3D model for animation. Further, the animated 3D object may be used in social networking, augmented books which depict the 3D animatable objects performing animations to illustrate the story line of the image depicted, animated movies, live chatting, virtual try-on (clothing, apparels) etc.

In an example, the animated full head rigged 3D morphable can be used as interactive 3D models in AR, MR and VR mediums. The personalized 3D morphable animated model (in the form of 3D object as their avatar) that resembles the user may be used as the interactive 3D models in AR, MR and VR mediums using the gesture based control over the bone base animation to orchestrate the animation of the personalized 3D morphable animated model.

Some other embodiments of the present subject matter may include AR, MR, VR system allowing the users to dynamically create and/or alter the content of interactive experience. For example, interactive implies, user may digitally touch to activate certain animation sequences. Such experiences may provide the user to interact and communicate digitally using their avatars (3D constructed models). Such 3D animated models used in social networking can be saved, comment on, and/or rate the experience in the social networking use case as well as copy the characteristics of the 3D image and re-use with a different face alone.

As described above, according to the present subject matter, a 3D avatar is created using only the frontal face pose of the human subject having one or more feature points. A full head 3D model is created without multiple camera views or inputs related to the head/face data for the 2D image. Therefore, the time consumed for processing and generating a 3D avatar has been greatly improved compared to conventional techniques. Therefore, the high cost and long production time, occurring when the existing 3D technology is used, can be significantly reduced. Furthermore, the augmented reality system provides plurality of animation to be presented at any instant of time in a single augmented reality medium.

As discussed, the system and the method of the present subject matter may be realized by interaction of different hardware and software components for creating the full head 3D morphable model, which can be rendered in one of the AR, the MR and the VR mediums. In an embodiment, the modules referred in this subject matter description, the software is made resident in an embedded form in suitable embedded processor system along with the database libraries for generating standalone 3D models to be rendered in AR/MR or VR supported smart computational devices all residing within the same device.

In yet another embodiment, the modules referred in this subject matter description, the software component that creates 3D objects may be made reside in a cloud based computing architecture and the computational devices that supports AR/MR and VR devices communicates by sending the 2D frontal face image and receives the 3D models from the cloud The database for mapping to the polygonal mesh model is a set of libraries that have the mesh data for pre-constructed models with the library data with specific age, gender and race based feature set.

The animation and audio (sound tracks) that are used with the 3D morphable model to be rendered are also available as separate data (files) that can be used for animating the 3D object. In another embodiment, the animation lip synced voice data can be extracted from the live voice that is part of an ongoing voice call between two users and lip animation is synced with the voice data in either direction.

Figure 4:
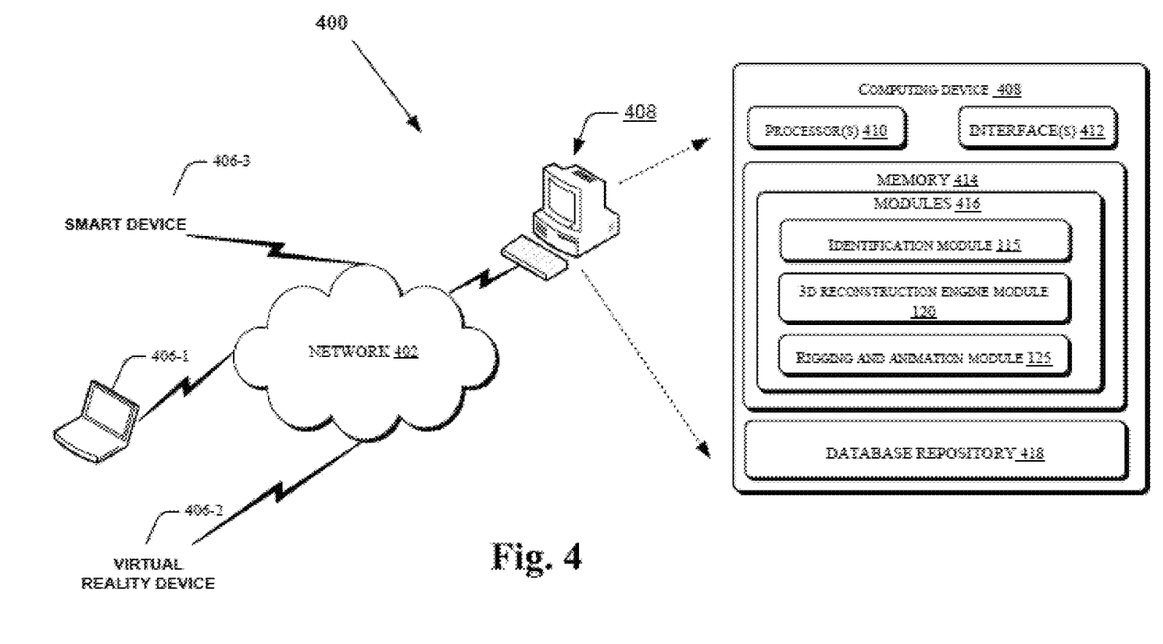
FIG. 4 illustrates various components of a distributed computer network system for a 3D full head morphable model generation and communication, in accordance with an embodiment of the present subject matter.

FIG. 4 illustrates a distributed computer network system for 3D morphable model generation and communication, in accordance with an embodiment of the present subject matter. The computing network 402 includes a plurality of computing devices 406 for receiving the full head 3D morphable model generated at a dedicated computing device 408.

In an embodiment, the computing network 402 may be a public network including a large number of computing devices 406. In another embodiment, the computing network 402 may be a private network with a limited number of computing devices.

The computing devices 406 may a desktop personal computer or a portable computer 406-1, smart device 406-2, virtual reality device 406-3, etc.

The system 100 shown in the FIG. 1 may be implemented in the dedicated computing device 408 for generating the full head 3D morphable model with all the supporting computational methods and library database located in the dedicated computing device. The dedicated computing device 408 includes a processor 410 coupled to a memory 414, embedded modules 416 for generating the full head 3D morphable models, a database repository 418, and communication interfaces 412. Further, the memory 414 may include any device known in the art including, for example, volatile memory, such as static random access memory (SRAM) and dynamic random access memory (DRAM), and/or non-volatile memory, such as read only memory (ROM), erasable programmable ROM, hard disks, optical disks, and magnetic tapes. In an embodiment, the interfaces 412 may include hardware interface, for example, interface for peripheral device(s), such as a keyboard, a mouse, an external memory, a printer, etc. Additionally, the interfaces 412 may facilitate multiple communications within a wide variety of protocols and networks, such as a network, including wired networks, e.g., LAN, cable, etc., and wireless networks, e.g., WLAN, cellular, satellite, etc.

The embedded modules 416 residing in the memory 414 may include programs, routines, objects, components, data structures, etc., which perform particular tasks or implement particular abstract data types. The data serves as a repository for storing data processed, received, and generated by one or more of the modules 416 and the processor 410. In an embodiment, the embedded modules 416 in the memory 414 may include an identification module 115, 3D reconstruction engine module 120, and rigging and animation module 125. These modules 416 work in tandem, as previously discussed, to generate the full head 3D morphable model.

Further, the full head 3D morphable models may be sent via the network 402 to be used in any one of AR, MR and VR mediums 130.

Although embodiments of methods in the present subject matter have been described in language specific to structural features and/or methods, it is to be understood that the present subject matter is not necessarily limited to the specific features or methods described. Rather, the specific features and methods are disclosed and explained in the context of a few example embodiments of the above-mentioned aspects of the present subject matter. The software and hardware and the components of the computing device can reside in the calling media device, remote server or a cloud.

I claim:

1. A system for generating a full head three-dimensional (3D) morphable model from a two-dimensional (2D) image for use in one of an augmented reality (AR), a virtual reality (VR) and a mixed reality (MR) medium, the system comprising:
    an image capturing unit to capture the 2D image of an object;
    an identification module to identify feature points as a collection of principal regions on a face portion of the 2D image, wherein the identification module is configured to correct the principal regions of the 2D image by re-sizing the feature points to obtain scaled principal regions; and
    a 3D reconstruction engine module to generate the full head 3D morphable model by mapping the feature points of the scaled principal regions with feature points of principal regions of predefined trained 3D mesh models stored in one or more databases to select one or more predefined 3D mesh models from the predefined trained 3D mesh models, wherein each selected 3D mesh model includes at least one principal region equivalent to a corresponding scaled principal region of the 2D image,
    wherein the predefined trained 3D mesh models are full head 3D mesh models, and wherein each full head 3D mesh model includes mesh vertices and a number of mesh vertices in each 3D mesh model is in the range from about 15000 points to 45000 points, and preferably 15000 points.

2. The system as claimed in claim 1, wherein the one or more databases comprise the predefined trained 3D mesh models categorized based on age, gender, and ethnicity, and wherein the 3D reconstruction engine module selects the one or more predefined 3D mesh models from the one or more databases based on at least one of age, gender, and ethnicity of the object in the 2D image.

3. The system as claimed in claim 1, wherein the 3D reconstruction engine module selects the one or more 3D mesh models from the predefined trained 3D mesh models by comparing values of vertex points of the principal regions of features of the predefined trained 3D mesh models with values of vertex points of the principal regions of the corresponding features of the 2D image.

4. The system as claimed in claim 1, wherein the 3D reconstruction engine module constructs the full head 3D mesh model by combining at least one principal region of the selected 3D mesh models.

5. The system as claimed in claim 1, wherein the 3D reconstruction engine applies the texture of the input 2D image on the full head 3D morphable model.

6. The system as claimed in claim 1, wherein the resizing of the principal regions includes enhancing the length and width of the principal regions of the 2D image.

7. The system as claimed in claim 1, wherein the at least one principal region of the selected mesh models is equivalent to a corresponding scaled principal region of the 2D image if values of vertex points of the at least one principal region of the selected mesh models are close to values of vertex points of the corresponding scaled principal region of the 2D image.

8. The system as claimed in claim 1, wherein the system further comprises a rigging and animation module wherein the rigging and animation module is configured to:
    join a neck zone of the full head 3D morphable model with a body of an animatable object by positioning mesh vertices of the full head 3D morphable model in the neck zone over top end vertices of a mesh model of the body to obtain a final 3D morphable model;
    add audio content to cause the final 3D morphable model to lip-sync the audio content; and
    render the final 3D morphable model in one of the AR, the MR or the VR mediums with the animation and the lip-sync.

9. The system as claimed in claim 8, wherein the body includes a bone structure to provide skeletal animation, wherein the skeletal animation activates an animation of the full head 3D morphable model.

10. A method for generating a full head 3D morphable model from a 2D image for use in one of an augmented reality (AR), virtual reality (VR) and mixed reality (MR) mediums, the method comprising:
    capturing the input 2D image;
    identifying one or more feature points or landmark as a collection of principal regions on a face portion of the 2D image;
    correcting the principal regions of the 2D image by re-sizing the feature points to obtain scaled principal regions; and
    generating the full head 3D morphable model by mapping the feature points of the scaled principal regions with feature points of principal regions of predefined trained 3D mesh models stored in one or more databases to select one or more 3D mesh models from the predefined trained 3D mesh models, wherein each selected 3D mesh model includes at least one principal region equivalent to a corresponding scaled principal region of the 2D image, wherein the full head 3D morphable model is constructed by combining the at least one principal region of each of the selected 3D mesh models and wherein each full head 3D mesh model includes mesh vertices and a number of mesh vertices in each 3D mesh model is in the range from about 15000 points to 45000 points, and preferably 15000 points.

11. The method as claimed in claim 10, wherein the selecting the one or more 3D mesh models from the predefined trained 3D mesh models includes comparing values of vertex points of the principal regions of features of the predefined trained 3D mesh models with values of vertex points of the principal regions of the corresponding features of the 2D image.

12. The method as claimed in claim 10, wherein the one or more databases comprise the predefined trained 3D mesh models categorized based on age, gender, and ethnicity, and wherein the one or more predefined 3D mesh models are selected from the one or more databases based on at least one of age, gender, and ethnicity of the object.

13. The method as claimed in claim 10, wherein the method comprising constructing the full head 3D mesh model by combining the at least one principal region of the selected predefined trained 3D mesh models.

14. The method as claimed in claim 10, wherein the method comprising applying a texture for the full head 3D morphable model based on texture of the input 2D image.

15. The method as claimed in claim 10, wherein the method further comprises:
  rigging the full head 3D morphable model to a body of an animatable object by positioning mesh vertices of the full head 3D morphable model in the neck zone over top end vertices of a mesh model of the body to obtain a final 3D morphable model;
  animating the final 3D morphable head model by adding audio content to cause the final 3D morphable model to lip-sync the corresponding audio content; and
  rendering the final 3D morphable model in one of the AR, the MR or the VR display mediums.

16. The method as claimed in claim 15, wherein the audio content is content of a voice call that is part of the AR, the MR or the VR mediums in a smart device used for communication of voice.

17. The method as claimed in claim 15, wherein the body includes a bone structure to provide skeletal animation, wherein the skeletal animation activates an animation of the full head 3D morphable model.

* * * * *